US011576398B2

(12) United States Patent
Tassi et al.

(10) Patent No.: US 11,576,398 B2
(45) Date of Patent: Feb. 14, 2023

(54) MACHINE FOR MAKING LIQUID OR SEMI-LIQUID PRODUCTS

(71) Applicant: ALI GROUP S.R.L.—CARPIGIANI, Cernusco Sul Naviglio (IT)

(72) Inventors: Federico Tassi, Bologna (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 155 days.

(21) Appl. No.: 17/188,644

(22) Filed: Mar. 1, 2021

(65) Prior Publication Data

US 2021/0274806 A1    Sep. 9, 2021

(30) Foreign Application Priority Data

Mar. 5, 2020    (IT) .................. 102020000004708

(51) Int. Cl.
*A23G 9/28* (2006.01)
*A23G 9/22* (2006.01)
*A23G 9/30* (2006.01)

(52) U.S. Cl.
CPC ............... *A23G 9/28* (2013.01); *A23G 9/224* (2013.01); *A23G 9/30* (2013.01)

(58) Field of Classification Search
CPC . A23G 9/28; A23G 9/224; A23G 9/30; A23G 9/08; A23G 9/22; A23G 9/228;
(Continued)

(56) References Cited

U.S. PATENT DOCUMENTS 3,291,076 A * 12/1966 Flanigan ................. B01F 27/92
366/310
2009/0120306 A1    5/2009 DeCarlo et al.
(Continued)

FOREIGN PATENT DOCUMENTS

EP        1068803 A1    1/2001
EP        2142006 A1    1/2010
(Continued)

OTHER PUBLICATIONS

Talian Search Report dated Oct. 28, 2020 from counterpart Italian App 202000004708.

*Primary Examiner* — Emmanuel E Duke
(74) *Attorney, Agent, or Firm* — Shuttleworth & Ingersoll, PLC; Timothy J. Klima

(57) ABSTRACT

A machine for making ice cream includes a first transfer channel configured to transfer a base product from a processing container to a dispensing section; a second transfer channel configured to transfer additional product from a feed device to the dispensing section; a shutter movable between closed and opens positions for controlling opening and closing of the first transfer channel, and in which the second transfer channel is formed; a containing body in which the shutter is slidably movable and having an abutment portion configured to receive a head portion of the shutter at the closed position; a drive and control unit; the second transfer channel being made internally of the shutter and, a heating device associated as one with the shutter to heat the additional product inside the second channel and connected to and controlled by the drive and control unit.

13 Claims, 2 Drawing Sheets

(58) Field of Classification Search
CPC ........ A23G 9/281; A23G 9/282; A23G 9/288; A23G 9/48; A23G 9/12; A23G 9/045; A23G 9/225
See application file for complete search history.

(56) References Cited

U.S. PATENT DOCUMENTS

| | | | |
|---|---|---|---|
| 2016/0128353 A1* | 5/2016 | Cocchi | A23G 9/08 |
| | | | 99/467 |
| 2016/0353767 A1* | 12/2016 | Cocchi | B65D 85/78 |
| 2017/0295820 A1* | 10/2017 | Cocchi | A23G 9/222 |
| 2020/0060306 A1 | 2/2020 | Evans | |

FOREIGN PATENT DOCUMENTS

| | | | | |
|---|---|---|---|---|
| EP | 2345332 A1 * | 7/2011 | ............. | A23G 9/282 |
| EP | 2345332 A1 | 7/2011 | | |
| EP | 3100615 A1 | 12/2016 | | |

* cited by examiner

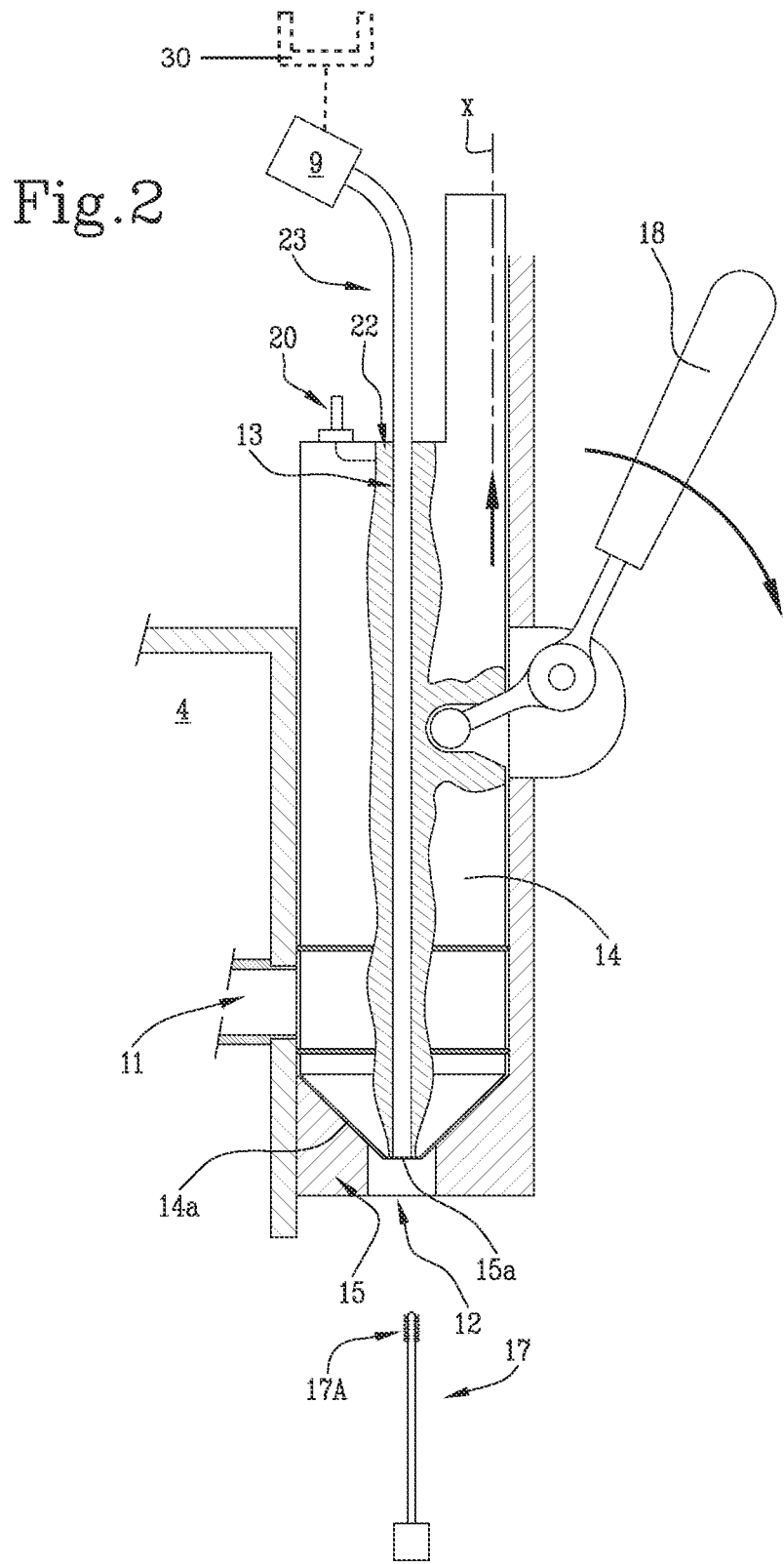

MACHINE FOR MAKING LIQUID OR SEMI-LIQUID PRODUCTS

This application claims priority to Italian Patent Application 102020000004708 filed Mar. 5, 2020, the entirety of which is incorporated by reference herein.

This invention relates to a machine for making liquid or semi-liquid products and widely used in the food industry.

In the industry concerned, there is a strongly felt need to make liquid or semi-liquid food products, such as ice cream, soft-serve ice cream or shakes, in different flavours starting from the same base product.

The liquid or semi-liquid base product is flavoured and/or variegated using additional products in the form of syrups of different flavours and/or colours.

Known in the prior art are machines configured to dispense the base product and to distribute one or more syrups on top of it and/or inside it in order to obtain a variegated product.

More in detail, machines of this kind usually comprise a processing chamber where the liquid or semi-liquid base product is processed and one or more containing chambers for the syrup. Each chamber is connected to a dispensing device by a respective channel which is opened/closed according to the type and quantity of base product or syrup to be dispensed. These machines, therefore, allow dispensing the base product and adding one or more syrups to it in such a way as to obtain a variegated product with a small amount of the selected syrup on top of it or inside it.

These machines, however, have inherent disadvantages relating to maintenance and food safety.

After being used for a certain number of times, the syrup channels become encrusted and clogged, with the risk of contaminating the product fed out of the machine.

This problem is strongly felt, for example, when using chocolate syrups which tend to form sticky lumps that adhere to the walls of the channel.

In this situation, the machine must be dismantled almost entirely in order to clean it to remove the sticky deposits obstructing the passage of the syrup. Very often, this is a highly time-consuming operation and one that must be carried out by a skilled technician.

The aim of this invention is therefore to provide a machine for making liquid or semi-liquid products capable of ensuring high standards of product quality.

Another aim of this invention is to provide a machine for making liquid or semi-liquid products which is quick and easy to clean and which can, at the same time, prevent the formation of encrusted deposits.

The technical purpose and aims specified are substantially achieved by a machine for making liquid or semi-liquid food products, comprising the technical features set out in one or more of the accompanying claims.

Further features and advantages of the invention are more apparent in the detailed description below, with reference to a preferred, non-limiting embodiment of a machine for making liquid or semi-liquid food products.

The description is set out below with reference to the accompanying drawings which are provided solely for purposes of illustration without restricting the scope of the invention and in which:

FIG. 2 shows a cross sectional view of a detail of the machine of FIG. 1.

Figure 1:
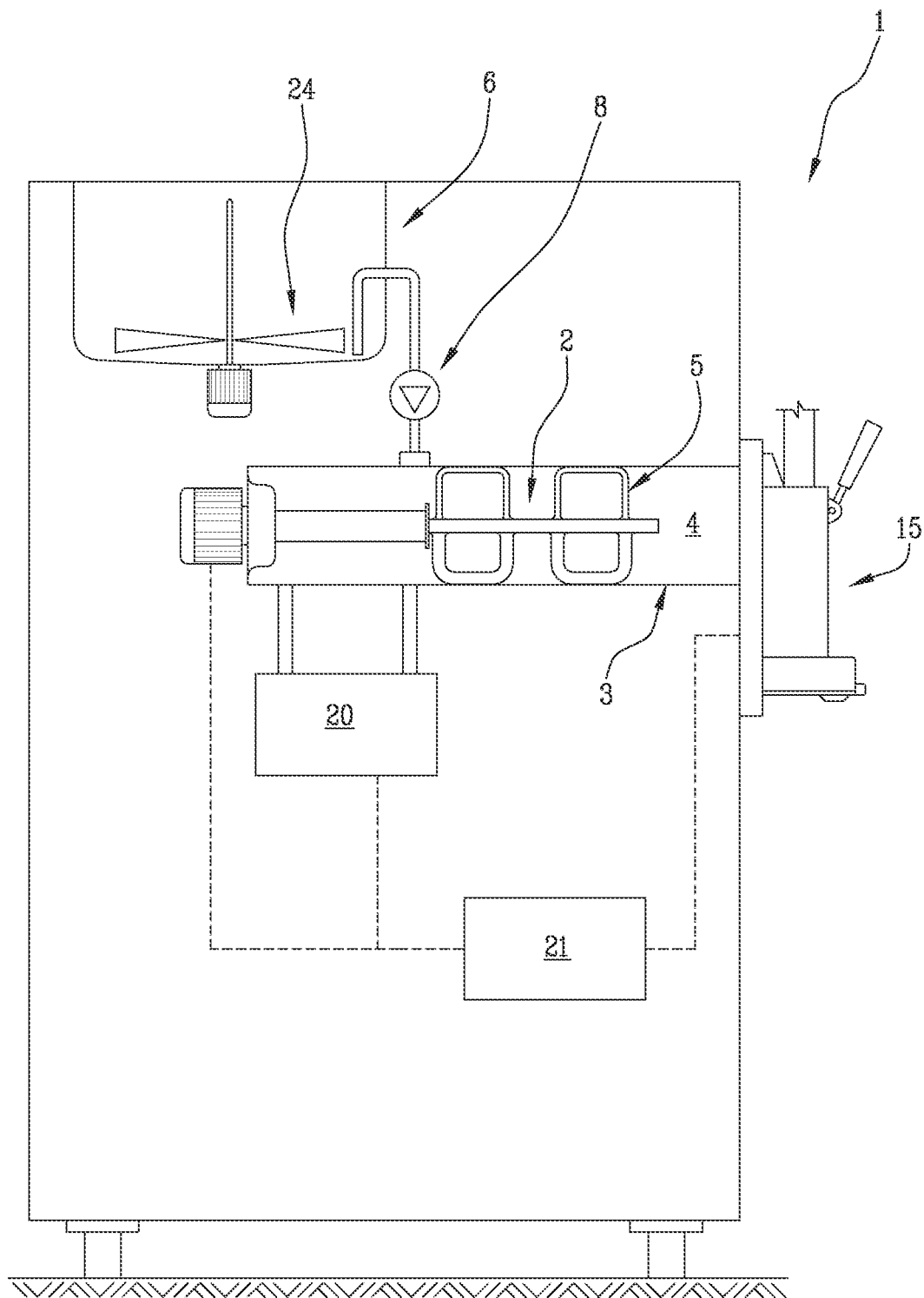
FIG. 1 shows a cross sectional view of a machine according to this invention.

With reference to the accompanying drawings, the numeral 1 denotes a machine for making liquid or semi-liquid products forming the object of this invention.

The machine 1 is preferably adapted to make ice cream (preferably soft-serve ice cream).

The soft ice cream made is variegated.

It should be noted that the variegated product is generally made from a plain ice cream to which one or more additional products are added. In the context of the invention, therefore, the term "variegated product" means any food preparation based on sugars, milk (and/or products derived therefrom) and cream, to which at least one flavouring is added.

In other words, the machine 1 is adapted to make the variegated product from a base ingredient, that is to say, a plain product comprising the liquid or semi-liquid base product (hereinafter also called "base product") and one or more additional products (hereinafter also called "syrups").

Defined according to the invention is a machine for making ice cream, comprising:
- a production unit 2 comprising a processing container 3 for processing a liquid or semi-liquid base product, defining a processing chamber 4 and provided with a stirrer 5 rotating inside the processing chamber 4;
- a thermal treatment system 20 associated with the processing container 3 for heating/cooling the processing chamber 4;
- a feed device 9 for feeding an additional product;
- a first transfer channel 11 configured to transfer the liquid or semi-liquid base product from the processing container 3 to a dispensing section 12;
- at least one second transfer channel 13 configured to transfer the additional product from the feed device 9 to the dispensing section 12;
- a shutter 14 movable between a closed position and an open position for, respectively, controlled opening and closing of the first transfer channel 11, and in which the second transfer channel 13 is formed;
- a containing body 15 in which the shutter 14 is slidably movable along a direction of translation X and having an abutment portion 15a configured to receive a head portion 14a of the shutter 14 at the closed position;
- a drive and control unit 21.

According to another aspect, the at least one second transfer channel 13 is made inside the shutter 14.

According to yet another aspect, the machine 1 comprises a heating device 22 which is associated as one with the shutter 14 in such a way as to heat the additional product inside the at least one second channel 13 and which is connected to the drive and control unit 21 to be controlled by it.

It should be noted, therefore, that the heating device 22 is movable as one with the shutter 14.

FIG. 1 shows a first embodiment of the invention.

In this embodiment, the machine 1 comprises a production unit 2 provided with a processing container 3 containing the liquid or semi-liquid base product. The processing container 3 defines a processing chamber 4 in which a rotary stirrer 5 processes the liquid or semi-liquid base product by continuously stirring it.

Preferably, the processing container 3 is made in the form of a horizontal batch freezing cylinder configured to process the liquid or semi-liquid base product at temperatures suitable for making the plain product.

To keep these temperatures, the machine 1 comprises a thermal treatment system 20 associated with the processing container 3 for heating/cooling the processing chamber 4. More specifically, the thermal treatment system 20 is provided with a heat exchanger configured to exchange heat and to cool the processing container 3 in such a way that the liquid or semi-liquid base product is at a temperature between −12 C.° and −2 C.° during processing.

Preferably, the machine 1 is also equipped with further thermal treatment means comprising at least one heat exchanger (not illustrated) and configured to heat or cool the walls of a further container 6 provided with a further stirring element 24.

The further container 6 is used substantially to pasteurize the liquid or semi-liquid base product, which is then transferred into the processing container 3 through a duct 7 equipped with a transfer pump 8.

The machine 1 also comprises a feed device 9 for feeding the additional product and from which the additional product is delivered in controlled manner in such a way as to variegate the base product.

In the specific embodiment illustrated in FIG. 1, the feed device 9 may comprise a socket 30 (see FIG. 2) for receiving a syrup capsule which is opened (for example, perforated) the moment the machine 1 is used so as to allow the egress of the syrup.

In other variant embodiments not illustrated, the feed device 9 may be made differently and, more specifically, may comprise one or more containers in which the additional product is held in a substantially liquid form so that it can be drawn from the container during use of the machine 1 or, still differently, one or more feed lines for supplying one or more additional products.

Preferably, the additional product is chocolate.

Preferably, the second transfer channel 13 extends along an at least partly vertical direction between a first, upper end 13a, connected or connectable to the feed device 9, and a second, lower end 13b directed towards the dispensing section 12 to preferably define a gravity feed system for feeding the additional product.

Preferably, as set out above, the machine 1 also comprises at least one control and drive unit 21 configured to drive and control the heating device 22.

Furthermore, the control and drive unit 21 may control the motor of the stirrer 5 and/or of the stirrer 6 and other actuators (for example, the pump 8).

Preferably, the control and drive unit 21 may comprise a user interface provided with controls configured to regulate the type (flavour and quantity) of the additional product to be delivered.

Operatively, therefore, once a user has selected a specific additional product, the control and drive unit 21 causes a predetermined quantity of the selected additional product to be transferred from the feed device 9 to the dispensing section 12.

In the case of the embodiment of FIG. 1 in particular, the liquid or semi-liquid base product and the additional product, when they are dispensed, form the variegated product outside the machine 1 and preferably inside a serving container (a cup or a cone, for example) placed under the dispensing section 12. More precisely, the additional product may be dispensed simultaneously with the liquid or semi-liquid base product so that the machine 1 delivers a variegated product proper or it may be dispensed after the liquid or semi-liquid product has been dispensed so as to form a topping for the base product.

The heating device 22 advantageously prevents the second transfer channel 13 from clogging as the result of deposits of additional product drying and adhering to the inside walls of the second transfer channel 13 and also allows the additional product at the delivery zone to be kept at the right consistency/viscosity at all times.

Preferably, in this embodiment, the machine 1 may comprise an electric heating device 22, built into the shutter 14 and configured to promote fluidification of the additional product.

While the additional product is being dispensed, it is in fact important to keep it at a level of viscosity that is optimal for dispensing. Since the optimal level of viscosity varies according to the type of additional product to be dispensed, the heating device 22 comprises an electrical heating element having at least two electrical connectors 20 connected to an energy source so as to promote controlled raising or lowering of the temperature of the additional product flowing inside the second channel 13 of the shutter 14.

Advantageously, the heating device 22 contributes to cleaning the second transfer channel 13 in that, by heating at least one portion of the second transfer channel 13 (coinciding with the extension of the shutter 14), it helps to melt the encrusted deposits that may have formed in the transfer channel 13.

According to another aspect, the machine 1 may also comprise a cleaning device 17 provided with at least one cleaning means 17a inserted or insertable into the second transfer channel 13 to mechanically remove the encrustations from the inside of it.

Preferably, the cleaning means 17a is inserted or insertable into the second transfer channel 13 through the first or the second end 13a, 13b of the second transfer channel 13.

Alternatively, the cleaning means 17a is inserted into the transfer channel 13 through a specific opening made along the transfer channel 13 itself. This solution is advantageous in the case where the additional product is fed from a container or a feed line and not from a capsule.

In use, the cleaning means 17a is inserted into the second transfer channel 13 and is moved along the full length of the second transfer channel 13 with vertical reciprocating motion in such a way as to scrape off the encrusted deposits. After the cleaning operations, the cleaning means 17a is extracted from the second transfer channel 13 and placed at a rest position which allows the additional product to flow normally along the second transfer channel 13.

According to an aspect, the cleaning means 17a comprises a brush element and is made substantially in the form of a pipe brush.

Advantageously, the brush element allows thoroughly removing the encrustations, especially the very sticky ones (such as those of fruit or honey syrups), preventing the cleaning means 17 from sticking inside the second transfer channel 13.

In a further embodiment not illustrated, the cleaning means 17a comprises a rigid scraper whose outer contour is substantially shaped to match the inner contour of the second transfer channel 13.

Advantageously, as it moves vertically, the scraper impacts against the encrusted deposits and removes them completely from the second transfer channel 13, preventing them from remaining partly stuck to the channel or to the cleaning means 17a itself.

Alternatively, the cleaning means 17a may be made in the form of a sheath-like element inserted snugly, preferably press-fitted, into the second transfer channel 13.

Advantageously, in this embodiment, the cleaning means 17a need not be moved to a rest position where it is totally extracted from the second transfer channel 13 because the cleaning means 17a made in this way occupies an extremely reduced space and in any case allows the additional product to flow inside the second transfer channel 13.

According to a further aspect, the cleaning means 17a may comprise a brush element that moves with a helical motion which facilitates removal of the encrusted deposits along the full length of the second transfer channel 13.

Advantageously, this solution also allows removing encrusted deposits that might form in possible recesses or surface defects inside the second transfer channel 13.

The second transfer channel 13 is made preferably of metallic material so that during operations to remove the encrusted deposits, the scraping action does not remove any of the material the interior of the second transfer channel 13 is made of.

According to another aspect, in the case where the additional product is fed from containers (or from feed lines) and not from capsules, the first end 13a of the second transfer channel 13 comprises a connector 21, connectable and disconnectable from the additional product feed device 9, exposing the first end 13a of the second transfer channel 13 to allow insertion of the cleaning means 17a during operations for cleaning the machine 1.

Operatively, the shutter 14 is slidable in a containing body 15 between an open configuration in which it simultaneously also opens the first transfer channel 11, and a closed configuration in which the head portion 14a of the shutter 14 comes into contact with an abutment portion 15a of the containing body 15 so as to close the first transfer channel. Preferably, the shutter 14 is movable thanks to a lever 18 located on the outside of the machine 1 and adapted to be gripped by a user.

By operating the lever 18, the shutter 14 allows the base product and the additional product to flow out of the machine 1 through a single dispensing nozzle located in a side or bottom portion of the containing body 15. In this situation, the dispensing section 12 is thus defined by the dispensing nozzle, through which the variegated product is delivered as a result of the movement of the shutter 14.

The invention achieves the preset aims overcoming the drawbacks of the prior art.

In particular, the heating device 22 allows dispensing the additional product under optimum conditions and also preventing problems regarding food contamination and obstruction of the second transfer channel 13.

Advantageously, existing machines 1 can be retrofitted with the heating device 22 by simply replacing the shutter 14.

The invention claimed is:

1. A machine for making ice cream, comprising:
a production unit comprising a processing container for processing a liquid or semi-liquid base product, defining a processing chamber and including a stirrer configured for rotating inside the processing chamber;
a thermal treatment system associated with the processing container for heating/cooling the processing chamber;
a feed device for feeding an additional product;
a first transfer channel configured to transfer the liquid or semi-liquid base product from the processing container to a dispensing section;
at least one second transfer channel configured to transfer the additional product from the feed device to the dispensing section;
a shutter movable between a closed position and an open position for, respectively, controlled opening and closing of the first transfer channel, and in which the second transfer channel is formed;
a containing body in which the shutter is slidably movable along a direction of translation and having an abutment portion configured to receive a head portion of the shutter at the closed position;
a drive and control unit;
the at least one second transfer channel being made internally of the shutter;
a heating device which is associated with the shutter and is configured to heat the additional product inside the at least one second transfer channel, the heating device being connected to the drive and control unit to be controlled by the drive and control unit.

2. The machine according to claim 1, wherein the heating device is an electrical device and is configured to promote fluidification of the additional product, the heating device being integrated in the shutter.

3. The machine according to claim 2, wherein the shutter comprises a pair of electrical connectors for connecting the heating device to an electrical energy source.

4. The machine according to claim 1, wherein the at least one second transfer channel extends inside the shutter along the direction of translation and leads out at the head of the shutter and wherein the first transfer channel leads out at a side portion of the shutter.

5. The machine according to claim 1, wherein the at least one second transfer channel extends along an at least partly vertical direction between a first end, connected or connectable to the feed device for feeding the additional product, and a second end directed towards the dispensing section.

6. The machine according to claim 5, wherein the at least one second transfer channel has, at the first end, a connector connectable to the feed device for feeding the additional product.

7. The machine according to claim 5, wherein the at least one second transfer channel is connected, at the first end, to the feed device and the feed device includes a socket configured for receiving a capsule of the additional product.

8. The machine according to claim 1, wherein the containing body comprises a dispensing outlet located at a side or bottom portion of the containing body and defining the dispensing section; the dispensing outlet being closed by the shutter in the closed configuration and being opened in the open configuration of the shutter.

9. The machine according to claim 1, wherein the at least one second transfer channel is made of metallic material.

10. The machine according to claim 1, further comprising a cleaning device configured to remove encrustations of the additional product in the at least one second transfer channel, the cleaning device comprising at least one cleaning means inserted or insertable into the at least one second transfer channel to mechanically remove the encrustations of the additional product inside the at least one second transfer channel.

11. The machine according to claim 10, wherein the cleaning means comprises a brush-like element.

12. The machine according to claim 10, wherein the cleaning means comprises a rigid scraper.

13. The machine according to claim 10, wherein the cleaning means has an outer contour that is substantially shaped to match an inner contour of the at least one second transfer channel and/or is insertable with a shape coupling into the at least one second transfer channel.

* * * * *